United States Patent [19]

Zweifel

[11] Patent Number: 4,709,336

[45] Date of Patent: Nov. 24, 1987

[54] DESCENT FLIGHT PATH CONTROL FOR AIRCRAFT

[75] Inventor: Terry L. Zweifel, Phoenix, Ariz.

[73] Assignee: Sperry Corporation, New York, N.Y.

[21] Appl. No.: 689,760

[22] Filed: Jan. 9, 1985

[51] Int. Cl.$^4$ .................... G05D 1/06; B64C 13/18

[52] U.S. Cl. .................... 364/433; 364/430; 244/183

[58] Field of Search ............... 364/428, 430, 433, 435; 73/178 T; 244/183, 185, 181, 186, 188

[56] References Cited

U.S. PATENT DOCUMENTS

| | | | |
|---|---|---|---|
| 3,666,929 | 5/1972 | Menn | 244/183 |
| 3,752,967 | 8/1973 | Vietor | 244/183 |
| 3,868,497 | 2/1975 | Vietor | 364/430 |
| 3,875,379 | 4/1975 | Vietor | 244/185 |
| 4,357,661 | 11/1982 | Lambregts et al. | 364/430 |
| 4,413,320 | 11/1983 | Brandau et al. | 364/428 |
| 4,471,439 | 9/1984 | Robbins et al. | 364/433 |

*Primary Examiner*—Felix D. Gruber
*Assistant Examiner*—Thomas G. Black
*Attorney, Agent, or Firm*—Arnold L. Albin

[57] ABSTRACT

Apparatus for the automatically controlling aircraft descent to a computed descent flight path. At any point in the descent portion of flight, a path error signal is used to compute an incremental speed command that is algebraically summed with a nominal descent speed command to cause the aircraft to converge to or maintain the computed descent path. Means are provided to rate limit the algebraic addition of the incremental speed command so that the convergence rate to the path is virtually constant for a given path error and so that the relatively short term dynamics of accelerating and decelerating the aircraft which may cause oscillatory behavior are avoided. The use of an incremental speed command permits a simplified control law over the prior art and permits the direct control of the minimum and maximum allowable speeds of the aircraft without the necessity of switching control laws or additional monitoring.

9 Claims, 5 Drawing Figures

DESCENT FLIGHT PATH CONTROL FOR AIRCRAFT

BACKGROUND OF THE INVENTION

1. Field of the Invention

The present invention relates generally to aircraft automatic flight control systems and more specifically to the capturing and control of a precomputed descent path.

2. Description of the Prior Art

Most commercial transport aircraft, general aviation aircraft, and military aircraft are equipped with an automatic flight control system. Automatic flight control systems generally provide the human pilot with the capability of altering the flight path of the aircraft.

Many of these aircraft are equipped with either Performance or Flight Management systems. These systems are generally interfaced with the automatic flight control system in such a way as to be able to control the flight path of the aircraft. This capability therefore allows the control of the aircraft to either a desired speed or altitude by adjusting its flight path to an appropriate value.

The aforementioned Performance and Flight Management systems often determine a computed descent path and speed to a predetermined geographical location. The calculation of these descent paths necessarily requires assumptions about the winds that will be encountered during the descent since the exact nature is unknown. Thus, winds that differ significantly from those assumed will cause the aircraft to deviate from the optimum path and thereby either under or overfly the desired geographical location.

Thus, it is desirable to devise some method of control that will capture and maintain the computed descent path. The method used in the prior art is to determine the difference between the aircraft altitude and the altitude of the descent path at the same point, thereby determining an altitude or path error. This error is then used to adjust the flight path angle of the aircraft until the error is null in the well-known method of feedback control systems.

In essence, this scheme is an altitude hold control law wherein the commanded altitude is continually decreasing. As the speed of the aircraft is not controlled directly, either excessively fast or slow speeds may occur during the corrections back to the computed path. To assure the aircraft does not exceed its performance capabilities, it is necessary to continuously monitor the speed of the aircraft and abandon the path correction feature and control the speed of the aircraft within acceptable limits should the speed of the aircraft approach its performance limits. Thus, such schemes are necessarily complex and entail the incorporation of altitude error and speed error control laws and a suitable means of switching between the two. Furthermore, it is generally necessary to have a different control law for capturing the path than is used for tracking the path since the capturing of a path is usually a much more dynamic maneuver than tracking.

The present invention overcomes the shortcomings of the prior art by utilizing an incremental speed command to cause convergence to and tracking of the computed descent path. As noted, Performance and Flight Management systems generally compute both a descent path and a nominal speed for descent. The present invention increases or decreases the commanded speed as a function of descent path error. Furthermore, the incremental speed to be added to the nominal descent speed is rate limited in such a way as to minimize any objectionable pitch maneuvers.

SUMMARY OF THE INVENTION

The present invention provides means for automatic capturing and tracking of a computed descent flight path for an aircraft by increasing or decreasing the nominal descent speed to cause convergence to the computed path. An incremental speed command is computed as a function of deviation from the computed path and is added algebraically to a nominal descent speed command. The incremental speed command is rate limited to minimize objectionable pitch maneuvers of the aircraft.

DESCRIPTION OF THE PREFERRED EMBODIMENTS

The present invention is useful in any Performance or Flight Management system or other system that computes a descent path for an aircraft to follow from its cruise altitude to any desired geographical point at a lower altitude and that is fully coupled to an automatic flight control or flight director system.

Figure 1:
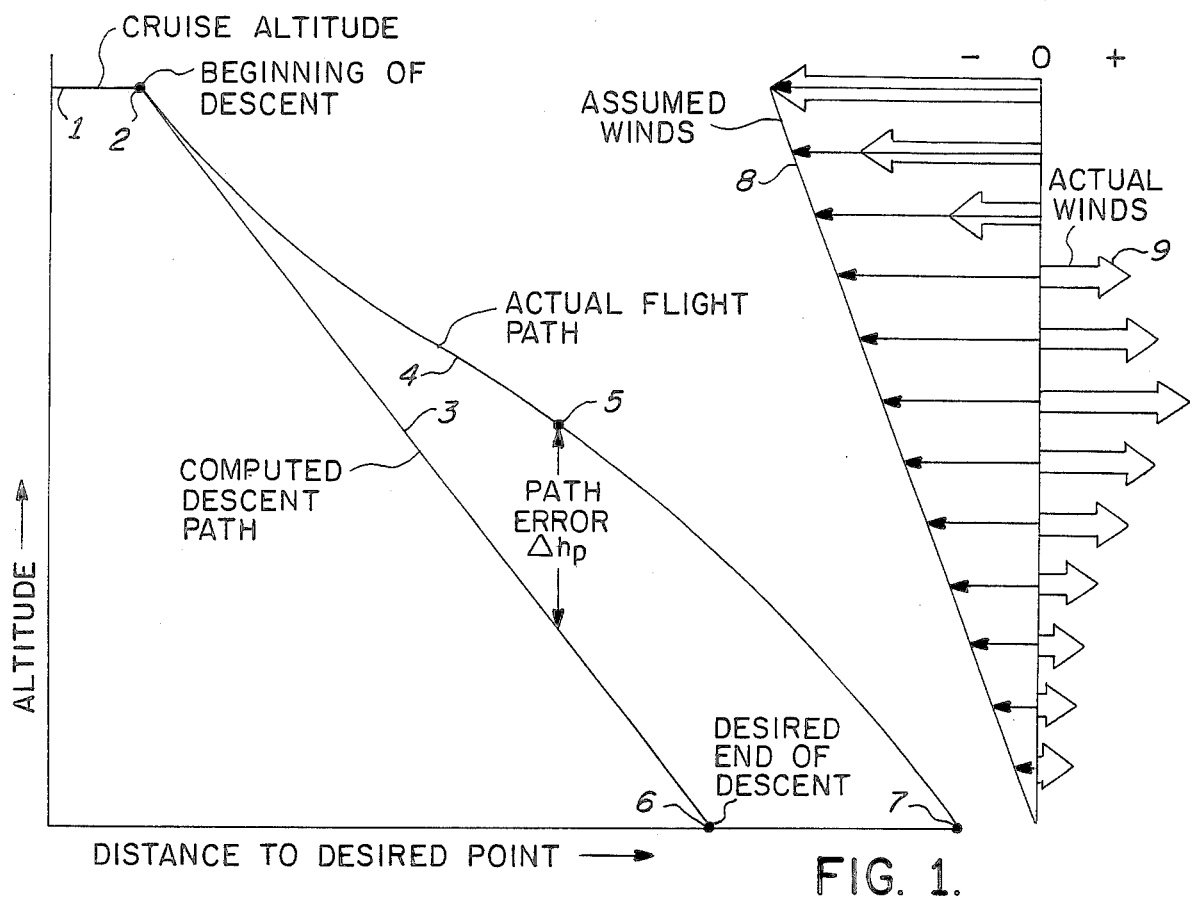
FIG. 1 is a graph of altitude versus distance illustrating a typical computed descent flight path and the assumed winds used in the computation. Superimposed on the graph is the actual descent flight path of the aircraft based on the actual winds encountered, the latter also being superimposed on the illustrative assumed winds.

Referring to FIG. 1, the computed descent path, 3, is a line based upon the desired descent speed of the aircraft and the assumed winds. Typically, the assumed winds are based on a linear decay of the wind measured at cruise altitude. This is represented on FIG. 1 by reference numeral 8 wherein the length of the arrows represent the magnitude of the wind at various altitudes.

The intersection of the computed descent path 3 with the cruise altitude defines the beginning of descent point 2. At this point, the aircraft should begin its descent at the nominal speed with the throttles at idle power. If the assumed winds are very nearly equal to the actual winds encountered, the aircraft would then descend along the computed descent path 3 until it reaches the desired end of descent point 6. However, should the actual winds differ significantly from those assumed, as for example the actual winds represented by the large arrows, 9, superimposed over the assumed winds, 8, the actual flight path of the aircraft will follow curve 4, and, thus miss the desired end of descent point 6.

At any given point during the descent, as for example point 5, a path error may be computed. The path error, defined as $\Delta h$, is derived by subtracting the actual altitude of the aircraft from the altitude of the computed descent path at the same point.

Figure 2:
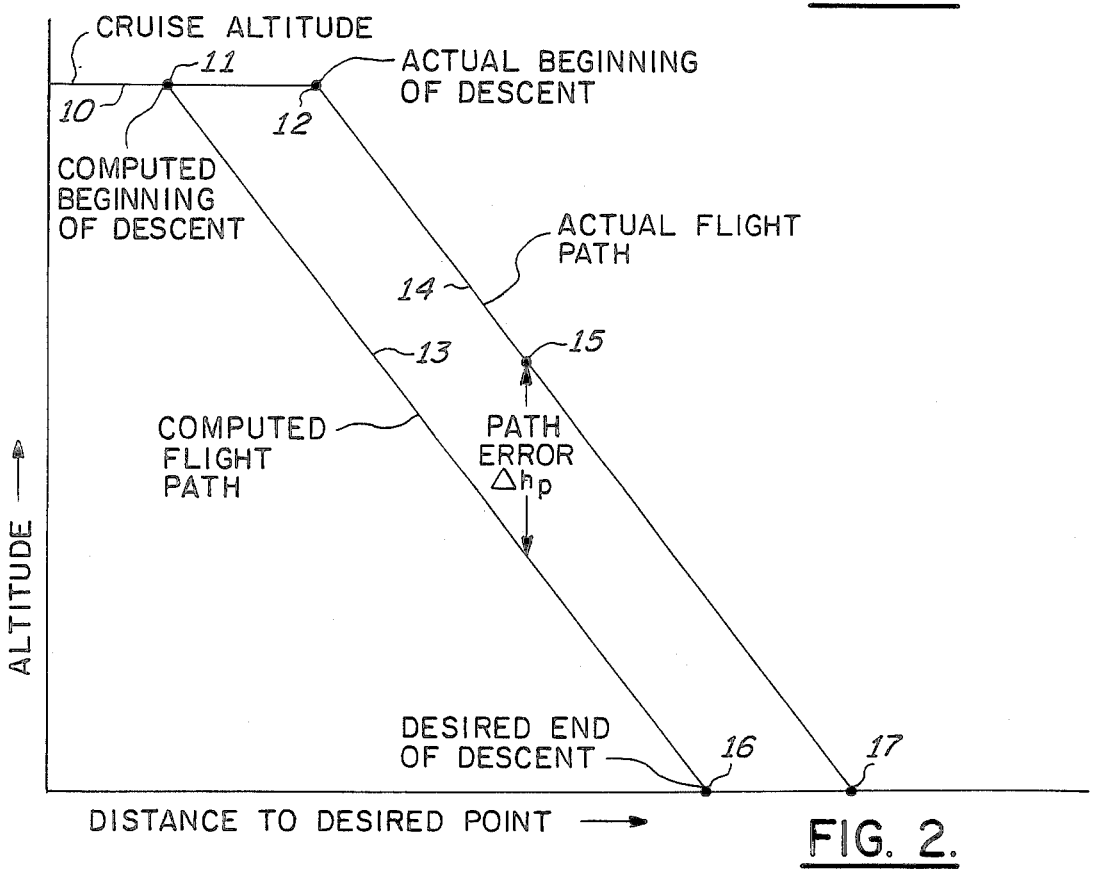
FIG. 2 is a graph of altitude versus distance illustrating a case of the aircraft beginning its descent significantly beyond the computed beginning of descent point with no wind.

Significant path errors may also develop in the absence of winds. Referring now to FIG. 2, the computed flight path 13 will intersect the cruise altitude of the aircraft, 10, at point 11, thus defining the computed beginning of descent point as described above. It is not uncommon for the beginning of a descent to be delayed because of Air Traffic Control restrictions. Thus, the aircraft may have to maintain its cruise altitude, 10, for some distance beyond the computed descent point 11 and to finally begin its descent at point 12. Flying at the desired speed, the aircraft's actual flight path, 14, will parallel the computed descent path 13 and hence the aircraft will fly beyond the desired end of descent point 16.

The present invention provides means for automatically compensating for path error that may occur due to either of the previously discussed causes or for any other reason. The invention takes advantage of the fact that an aircraft in descent will descend more quickly with an increase in speed and conversely will descend less quickly with a decrease in speed. Thus, in the case where the aircraft is above the computed descent path, increasing its speed above the nominal will tend to make the aircraft descend more quickly and hence cause it to converge toward the computed flight path.

Thus, an incremental speed command may be calculated that is proportional to the magnitude of the path error $\Delta h$. This incremental speed error may be algebraically added to the nominal descent speed command to cause the aircraft to increase or decrease its speed about the nominal and thus result in the aircraft converging with the computed path and hence arriving at the desired end of descent point. A further refinement of the present invention may be obtained by rate limiting the incremental speed command. The benefits of rate limiting may be appreciated from the following discussion.

Assume that the aircraft is significantly above the computed descent path and that a proportional incremental increase in speed is computed. As the aircraft begins to accelerate to the new speed, that is the nominal plus the incremental speed, it will necessarily increase its rate of descent. This will cause a decrease in the path error and thus a decrease in the proportional incremental speed command. The aircraft will then have to decelerate toward the new lesser computed speed. As it decelerates, its rate of descent will decrease and the path error will thus increase, causing an increase in the incremental speed command once more. The described action can cause an objectionable oscillatory tendency in the actual flight path of the aircraft which is eliminated by rate limiting the incremental speed command.

The derivation of the rate limiter is further obtained from the steady state longitudinal equation of motion of aircraft:

$$(T-D)/W = \dot{h}/v + \dot{v}/g \qquad (1)$$

where
T = the thrust of the aircraft in pounds
D = the drag of the aircraft in pounds
W = the weight of the aircraft in pounds
$\dot{h}$ = the rate of descent of the aircraft in feet per second
v = the true airspeed of the aircraft in feet per second
$\dot{v}$ = the change in airspeed with time (i.e. acceleration) in feet per second per second
g = the gravitational constant, 32.17 feet per second per second The thrust of the engine(s) at idle power is very nearly zero, the drag of the aircraft for relatively small changes in airspeed is very nearly constant, and the weight of the aircraft does not change significantly in descent. Thus, the left side of equation (1) is very nearly constant and for a typical modern commercial jet, the left side of equation (1) may be replaced by 0.07.

Using the value of 0.07, it being realized that the solution to the complete left hand expression could also be used, the above equation may be simplified to:

$$0.07 = \dot{h}/v + \dot{v}/g \qquad (2)$$

The term $v/g$ is relatively small compared to $h/v$ and may thus be ignored in this derivation. Consequently, the equation may be further simplified to:

$$0.07 = \dot{h}/v \qquad (3)$$

The above equation describes the relationship between the descent rate and true airspeed of the aircraft. Letting the subscript 1 denote the rate of descent at nominal descent speed and on the computed descent path condition and the subscript 2 denote any other condition, the above quotation may be solved for h and two general equations written:

$$\dot{h}_1 = 0.07 v_1 \qquad (4)$$

$$\dot{h}_2 = 0.07 v_2 \qquad (5)$$

Subtracting the former equation from the latter gives:
$$\dot{h}_2 - \dot{h}_1 = 0.07(v_2 - v_1) \qquad (6)$$

Defining $\Delta \dot{h} = \dot{h}_2 - \dot{h}_1$ and
$\Delta v = v_2 - v_1$ and substituting in the above equation gives:

$$\Delta \dot{h} = 0.07 \Delta v \qquad (7)$$

where $\Delta \dot{h}$ is the convergence rate to the computed descent path due to a change in true airspeed, $\Delta v$. As Mach number is a common speed measurement on modern aircraft, it may be used in the above equation by using the relationship:

$$\Delta v = a \Delta M \qquad (8)$$

where
$\Delta v$ = the incremental airspeed in feet per second
a = the speed of sound in feet per second at the actual altitude of the aircraft
$\Delta M$ = the incremental Mach number.
Substituting yields:

$$\Delta \dot{h} = 0.07 a \Delta M \qquad (9)$$

Thus, an incremental Mach number that is proportional to a path error $\Delta h$ will cause a convergence rate $\Delta \dot{h}$ to the computed path according to equation (9).

As previously stated, the incremental Mach number is proportional to the path error, $\Delta h$:

$$\Delta M = K_M \Delta h \tag{10}$$

where
- $\Delta M$ = the incremental Mach number, dimensionless
- $K_M$ = a constant of proportionality, in 1/feet
- $\Delta h$ = the difference between the actual altitude of the aircraft and the altitude of the computed descent path at a given distance from the end of descent point, in feet.

Taking the derivative of equation (10) with respect to time gives:

$$\Delta \dot{M} = K_M \Delta \dot{h} \tag{11}$$

where
- $\Delta \dot{M}$ = time rate of change of the incremental mach number, in 1/sec
- $K_M$ = a constant of proportionality, in 1/feet
- $\Delta \dot{h}$ = the descent path convergence rate, in feet per second Solving equation (11) for $\Delta \dot{h}$ and substituting into equation (10) yields:

$$\Delta \dot{M}/K_M = 0.07 a \Delta M \tag{12}$$

Solving for $\Delta \dot{M}$ yields:

$$\Delta \dot{M} = 0.07 a K_M \Delta M \tag{13}$$

Equation (13) is the expression for determining the rate limit on the incremental Mach number. By way of example, assume the value of "a" equals 1016 feet per second "$K_M$" equals 0.000075, and the aircraft is 500 feet above the computed descent path. $\Delta h$ is therefore 500 feet and the incremental Mach number to be added to the nominal descent speed is $K_M \Delta h$ or 0.0375. From equation (9), this value will result in a steady state convergence rate to the computed descent path of 2.7 feet per second or 160 feet per minute. From equation (13), this is equivalent to a $\Delta M$ rate of 0.0002 Mach per second. Therefore, algebraically adding the incremental Mach number at a rate of 0.0002 Mach per second to the nominal descent speed will yield a consistent 2.7 feet per second convergence to the computed descent path both during the acceleration to and achievement of the new descent speed. As the aircraft approaches the computed descent path, the path error, $\Delta h$, will, of course, decrease. This action results in a reduction in both the path convergence rate and the incremental Mach. As the aircraft decelerates to the lesser new speed it will, by the action described by equation (13), maintain the appropriate path convergence rate.

It will be appreciated from the foregoing that the overall action of the rate limit on the incremental Mach results in an exponential achievement of the computed descent path by virtue of the maintenance of a convergence rate consistent with the path error, $\Delta h$. Such a scheme minimizes the oscillatory tendencies aforementioned by eliminating the relatively short term dynamics of accelerating or decelerating the aircraft to a new descent speed.

The present invention may be implemented using conventional analog circuitry and computational techniques or by using conventional wholly digital techniques or by using conventional hybrid digital/analog techniques. To simplify the understanding of the invention, it will be explained by using a generally analog format as shown in FIG. 3, it being understood that the same analog format may also represent, in block diagram form, the program of a programmable digital computer wherein the various analog inputs are converted to digital signals for digital processing and the various digital outputs are converted to analog signals for driving the control surface servomotors and the like.

Figure 3:
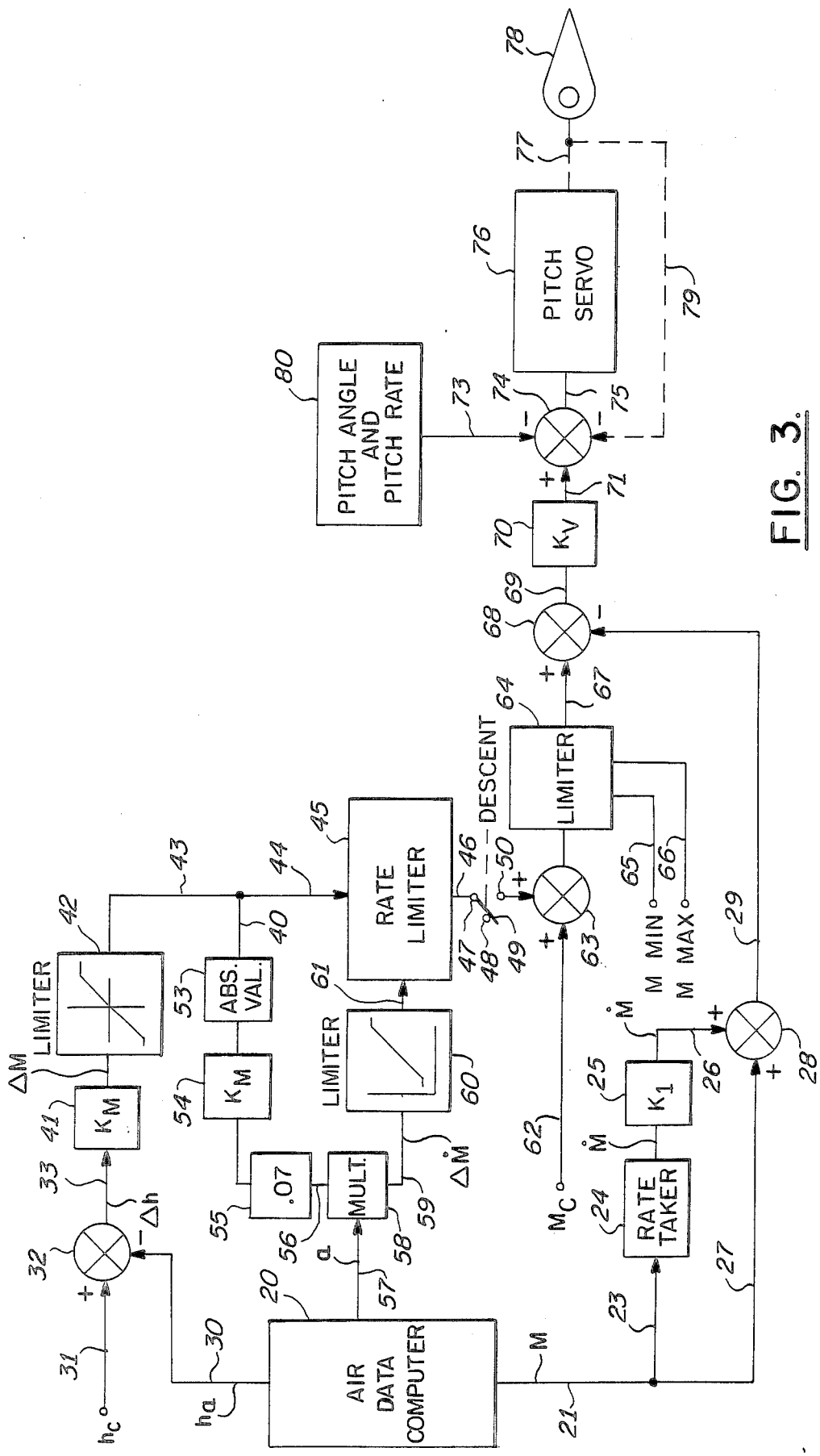
FIG. 3 is a block diagram of the present invention showing how the incremental airspeed is calculated, rate limited and added algebraically to the nominal descent speed command to cause the aircraft to converge onto the computed descent flight path.

Referring to FIG. 3, assume the aircraft has begun descending flight, either initialized by the human pilot or by automatic means. Switch blade 49 will then move from its shown position and make contact with terminal 50. Simultaneously conventional air data computer 20 supplies a signal proportional to the actual altitude of the aircraft, $h_A$ on lead 30 and thence to conventional summation device 32. A signal proportional to the altitude of the computed descent path, $h_C$ appears on lead 31 and thereby is impressed on summation device 32. Conventional summation device 32 operates in such a fashion as to supply the difference between the actual altitude of the aircraft and the altitude of the computed descent path, $\Delta h$, to lead 33 and thence to conventional gain block 41.

Conventional gain block 41 multiplies the signal on lead 33 by the value of $K_M$ as for example 0.000075. It will be seen that $K_M$ is identical with that shown in equation (10) and furthermore that the output of gain block 41 is an incremental Mach number equal to $K_M \Delta h$ in accordance with equation 10.

The output of gain block 41 is coupled to limiter 42 which limits the magnitude of the incremental Mach between positive and negative values, as for example $+0.05 \Delta M$. This limitation precludes excessively high or low speeds. The output of limiter 42 appears on lead 43 and thence to lead 40 and 44. Lead 44 supplies the signal proportional to the incremental Mach number to rate limiter 45, whose action will be described.

Lead 40 supplies the incremental Mach signal to conventional absolute value taker 53. Absolute value taker 53 outputs a signal equal to the magnitude of the input with a positive sign. The output of absolute value taker 53 is impressed on conventional gain block 54 which multiplies the impressed value by the value of $K_M$. The output of gain block 54 is a signal proportional to $K_M$ times the absolute value of the incremental Mach and is impressed on conventional gain block 55. Gain block 55 multiplies the impressed signal by 0.07. The output of gain block 55 appears on lead 56 and is a signal proportional to the term $0.07 K_M \Delta M$. The signal on lead 56 is impressed on conventional multiplier 58 which receives on lead 57 from conventional air data computer 20 a signal proportional to the speed of sound, a. The multiplier outputs the product of a and the impressed signal. The output of multiplier 58 is the solution of equation (13), thereby defining the rate at which the incremental Mach number is to be added to the nominal descent speed. The signal on lead 59 is impressed on limiter 60. Limiter 60 constrains its output between two selected values, as for example 0.00001 and 0.0005. Impressed values within these limits are output without modification. The output of limiter 60 appears on lead 61 and is supplied to rate limiter 45 as an input.

Rate limiter 45 functions in the following manner. Assume that the value of the signal on lead 44 changes instantaneously from one value to another, as for example from 0 to $0.03 \Delta M$. Accordingly, the signal appearing on lead 61 will be the solution to equation (13) or 0.07Ka times 0.03. For values of $K_M$ equal 0.00075 and a equal 1016, $\Delta M$ equals 0.00016. The rate limiter output which appears on lead 46 would increase from 0 to 0.03 at a rate of 0.00016$\Delta M$ per second, thus requiring 187.5 seconds to achieve the value of the input on lead 44 of 0.03. A similar action would occur for subsequent changes of the value on lead 44.

The output of the rate limiter appearing on lead 46 is impressed on switch contact 47 and subsequently through switch blade 49, switch contact 50 to conventional summation device 63.

The nominal descent speed command, $M_C$ appears on lead 62 and thence to summation device 63. The output of conventional summation device 63 is the algebraic sum of the impressed signals and therefore the sum of the nominal descent speed command and the incremental Mach command. The output of summation device 63 is impressed on limiter 64. Limiter 64 also receives the values of the maximum and minimum allowable Mach numbers on leads 66 and 65 respectively. These values may be prestored values within a digital computer or stored in conventional analog circuitry. Limiter 64 operates in such a manner as to constrain the output on lead 67 between the maximum and minimum values supplied on leads 66 and 65 respectively. Impressed values within these limits appear on lead 67 unmodified. It will be clear that the value appearing on lead 67 is thus a new descent speed command consisting of the nominal descent speed and an incremental Mach number proportional to path error that is constrained between the maximum and minimum allowable Mach numbers.

Conventional air data computer 20 supplies a signal proportional to the aircraft's Mach number on lead 21 and thence to conventional summation device 28 via lead 27 and to conventional rate taker 24 via lead 23. The output of rate taker 24 is a signal proportional to the time rate of change of Mach number, shown in the Figure as $\dot{M}$. The output of rate taker 24 is impressed on conventional gain block 25 whose action is to multiply the impressed signal by the value of $K_1$, a typical value being 3.0.

A signal proportional to $K_1\dot{M}$ is thence supplied to conventional summation device 28 via lead 26. Conventional summation device 28 forms the algebraic sum of the terms $M + K_1\dot{M}$ and supplies the signal to lead 29 and thence to conventional summation device 68.

Lead 67 couples the output of limiter 64 to conventional summation device 68. Summation device 68 takes the difference between the signals appearing on leads 67 and 29, the output appearing on lead 69. The signal appearing on lead 69 is thus the difference between the newly computed descent speed and the summation of the actual Mach number of the aircraft and its Mach rate.

The signal on lead 69 is impressed upon conventional gain block 70 whose function is to multiply the impressed signal by the value of $K_V$. The value of $K_V$ is such as to convert the impressed signal to a proportional voltage to drive pitch servomotor 76. The output of gain block 70 appears on lead 71 and is supplied to conventional summation device 74.

Signals proportional to the pitch angle and pitch rate 80 of the aircraft are supplied to summation device 74 via lead 73 in the conventional manner. The output signal of summation device 74 is applied to servomotor 76 which, through the mechanical linkage 77, moves the aircraft's elevator or horizontal stabilizer, 78. Mechanical linkage 79 supplies summation device 74 with a signal proportional to elevator or horizontal stabilizer position so that the signal on lead 75 is reduced to null in the steady state condition.

Figure 4:
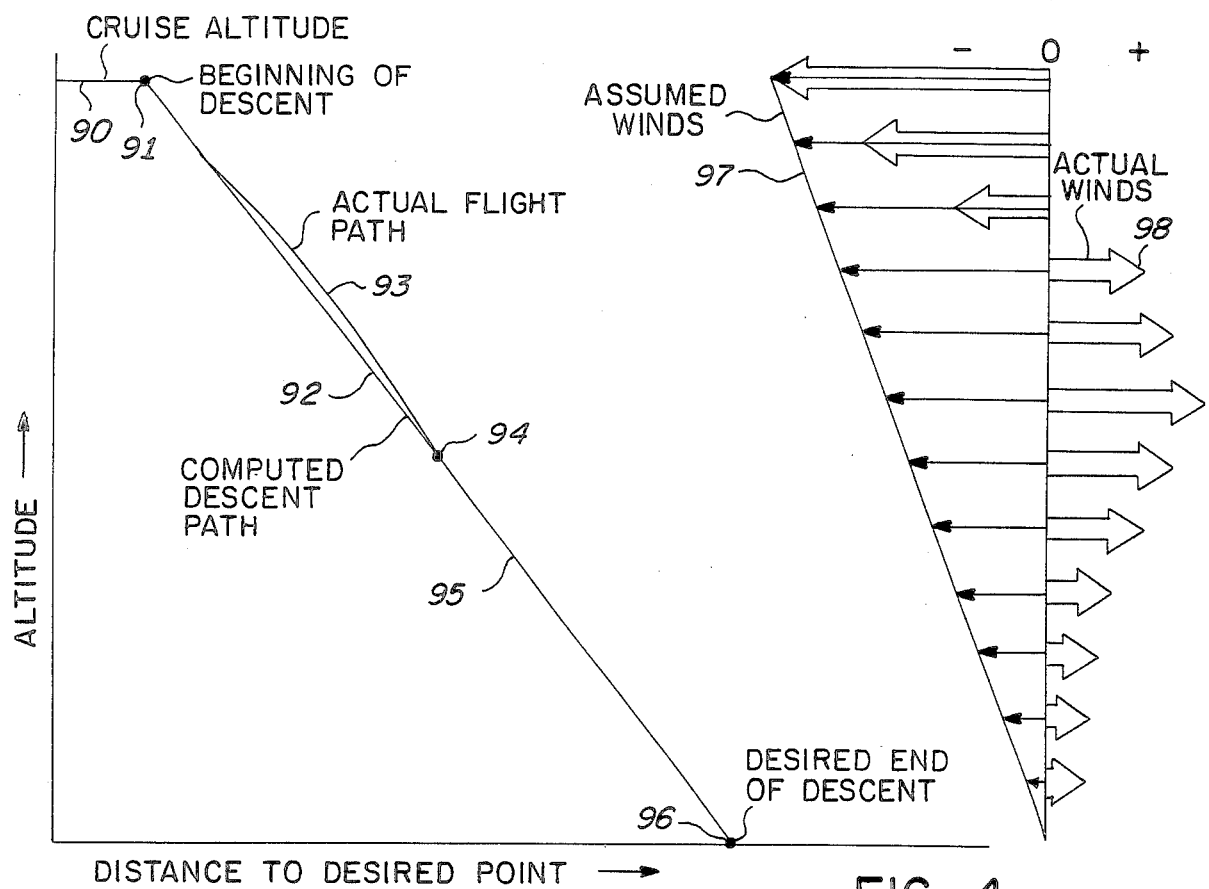
FIG. 4 is a graph similar in nature to FIG. 1 illustrating the action of the present invention in maintaining the computed descent flight path.

The action of the present invention may be understood by referring to FIG. 4. FIG. 4 is similar in nature to FIG. 1 except that the present invention is used to control the descent flight path of the aircraft in the manner described above. The aircraft begins its descent from its cruise altitude 90 at point 91, the beginning of descent point. As the aircraft descends, it will experience actual winds, 98, different from those assumed in the descent path computation, 97, and will therefore deviate from the computed path 92 along the curve 93, thereby experiencing a path error. Through the action described in FIG. 3, a rate limited incremental Mach number will be added to the nominal descent speed to produce a convergence back toward the computed descent path 92 until the aircraft is back upon the computed path and the path error is null. This occurs at point 94. Henceforth, small values of rate limited incremental Mach numbers will be added or subtracted from the nominal descent speed to maintain the aircraft on the computed descent path until the desired end of descent point 96 is achieved.

Figure 5:
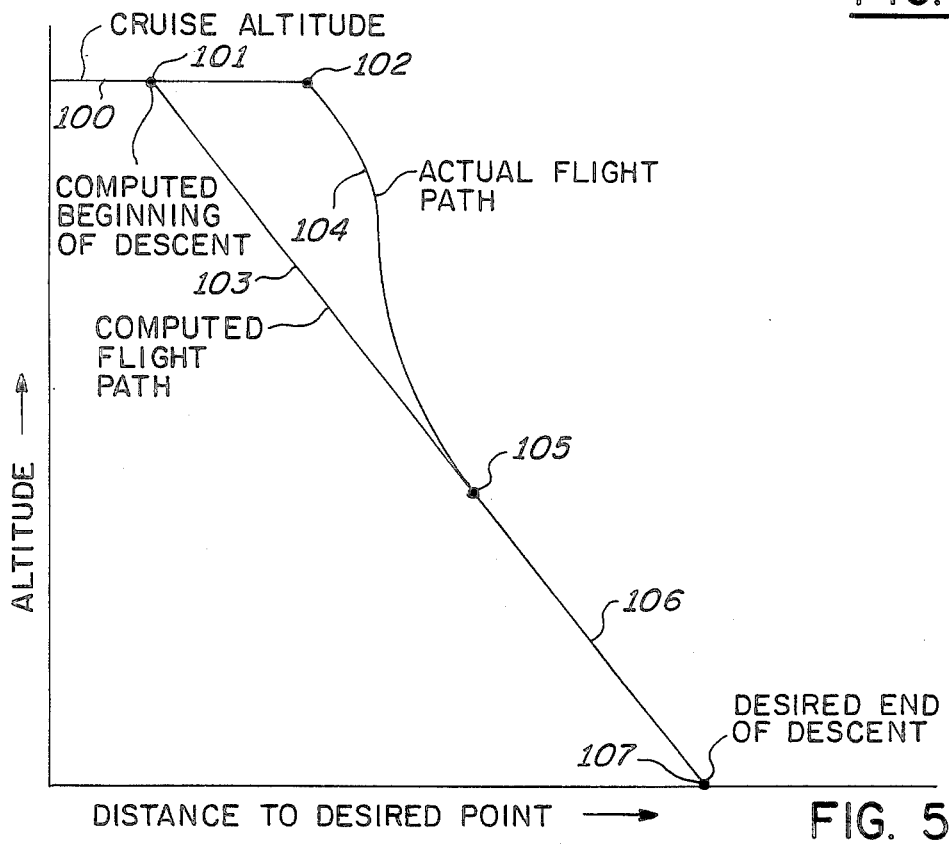
FIG. 5 is a graph similar in nature to FIG. 2 illustrating the action of the present invention in capturing and maintaining the computed descent flight path when the aircraft begins its descent significantly beyond the computed beginning of descent point.

FIG. 5, which is similar in nature to FIG. 2, illustrates the action of the present invention when the descent is begun at a distance significantly different from the computed beginning of descent point. The aircraft maintains a cruise altitude 100 until the descent is begun at point 102 which is significantly beyond the computed end of descent point 101. As the computed descent path is well below the actual altitude of the aircraft at point 102, a large path error occurs. The present invention computes a rate limited incremental Mach that is added to the nominal descent speed. The increased descent speed results in a higher rate of descent and thus produces a convergence rate to the computed path along the curve 104, the actual flight path of the aircraft. The aircraft continues along curve 104 until it intersects the computed flight path 103 at point 105. Since the path error has continually decreased during the convergence to the computed path, the rate limited incremental Mach has also decreased according to the action describe in FIG. 3 until the descent speed is equal to the nominal descent speed when the aircraft intersects the computed flight path 103. Hence, the aircraft's flight path will match the computed descent path during the line segment 106 until the desired end of descent point 107 is achieved.

From the foregoing, it will be appreciated that the present invention provides improved capturing and maintaining of a computed descent path in the following manner:

(1) An incremental speed is computed that is proportional to the magnitude and sign of the difference between the aircraft's actual altitude and the altitude of the computed descent path at the same point.

(2) The incremental speed is rate limited in such a fashion as to maintain a virtually constant convergence rate to the computed path consistent with the path error.

(3) The rate limited incremental speed is algebraically added to a supplied nominal descent speed to cause convergence to the computed descent path in an exponential fashion.

(4) The utilization of incremental speed impressed upon a nominal descent speed command permits simplified control over the prior art while allowing direct control over the maximum and minimum permissible speeds of the aircraft without additional monitoring.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. Descent control apparatus for an aircraft flight control system including servo means for controlling aircraft pitch attitude to increase or decrease the nominal descent speed and capture a computed flight path and means for providing signals representative of desired descent path altitude, actual altitude, aircraft forward speed, speed of sound, and a commanded nominal descent speed, said descent control apparatus comprising:
   means for providing a first signal representative of a difference between said aircraft actual altitude and said desired descent path altitude,
   means for multiplying said first signal by a predetermined value to provide a second signal representative of an incremental speed command,
   means for providing a third signal representative of an algebraic sum of said second signal and said nominal descent speed command signal,
   means for providing an output signal representative of a difference between said third signal and a fourth signal representative of a function of said aircraft forward speed, and
   means for applying said output signal to said servo means thereby to increase or decrease said nominal descent speed in accordance therewith.

2. Descent control apparatus as recited in claim 1 further comprising:
   means for rate limiting said second signal prior to summing with said nominal descent speed command signal for providing substantially constant rate of convergence to said desired descent path altitude.

3. Descent control apparatus as recited in claim 2 wherein said means for rate limiting further comprises:
   means for providing an absolute value of said second signal,
   means for multiplying said absolute value of said second signal by a signal representative of said speed of sound times a signed representative of a predetermined constant for providing a fifth signal,
   means for limiting said fifth signal between preselected values, and
   rate limiter means having inputs of said limited fifth signal and said second signal and output of said rate limited second signal.

4. Descent control apparatus as recited in claim 3 wherein said aircraft forward speed is aircraft Mach number.

5. Descent control apparatus as recited in claim 2 wherein said rate limited second signal is of the form:

$$\Delta \dot{M} = 0.07 a K_M \Delta M$$

where
$\Delta \dot{M}$ = time rate of change of said incremental Mach number
$K_M$ = constant of proportionality
$\Delta M$ = incremental Mach number
$a$ = speed of sound.

6. Descent control apparatus as recited in claim 5 wherein said fourth signal is of the form:

$$\Delta M = K_M \Delta h$$

where
$\Delta M$ = incremental Mach number
$K_M$ = a constant of proportionality
$\Delta h$ = difference between said actual altitude and desired descent path altitude.

7. Descent control apparatus as recited in claim 2 further comprising:
   means for deriving the rate of change of said aircraft forward speed signal, send derived signal corresponding to said fourth signal, and
   means for providing an algebraic sum of said derived aircraft forward speed signal and said aircraft forward speed signal.

8. Descent control apparatus as recited in claim 2 further comprising means for limiting said third signal to provide for a minimum and maximum output signal to maintain pitch altitude within a predetermined range.

9. Descent control apparatus as recited in claim 1 further comprising:
   means for limiting said second signal within a predetermined range.

* * * * *